United States Patent [19]

Torii et al.

[11] Patent Number: 5,251,500
[45] Date of Patent: Oct. 12, 1993

[54] INDUSTRIAL ROBOT WITH A COMPOUND DRIVE MECHANISM

[75] Inventors: Nobutoshi Torii, Hachioji; Ryo Nihei; Mitsuhiro Yasumura, both of Yamanashi, all of Japan

[73] Assignee: Fanuc Ltd., Yamanashi, Japan

[21] Appl. No.: 859,371

[22] PCT Filed: Sep. 27, 1991

[86] PCT No.: PCT/JP91/01290

§ 371 Date: May 26, 1992

§ 102(e) Date: May 26, 1992

[87] PCT Pub. No.: WO92/05921

PCT Pub. Date: Apr. 16, 1992

[30] Foreign Application Priority Data

Sep. 27, 1990 [JP] Japan .................. 2-255378

[51] Int. Cl.[5] .................. F16H 25/20; B25J 18/00
[52] U.S. Cl. .................. 74/89.15; 74/479 BP; 901/23
[58] Field of Search ........ 74/89.15, 424.8 R, 424.8 B, 74/479 BP; 192/141, 149; 901/23

[56] References Cited

U.S. PATENT DOCUMENTS

| | | | |
|---|---|---|---|
| 2,630,022 | 3/1953 | Terdina | 74/424.8 B |
| 2,660,281 | 11/1953 | Ochtman | 192/141 |
| 3,717,231 | 2/1973 | Kaufeldt | 192/149 X |
| 3,803,927 | 4/1974 | Lawler | 74/89.15 |
| 3,805,629 | 4/1974 | Martin et al. | 74/89.15 |
| 4,614,128 | 9/1986 | Fickler | 74/89.15 X |
| 4,864,880 | 9/1989 | Grant et al. | 74/110 |

FOREIGN PATENT DOCUMENTS

| | | |
|---|---|---|
| 0048904 | 4/1982 | European Pat. Off. . |
| 0154825 | 9/1985 | European Pat. Off. . |
| 0232999 | 8/1987 | European Pat. Off. . |
| 2187071 | 1/1974 | France . |
| 2587643 | 3/1987 | France . |
| 58-41990 | 9/1983 | Japan . |
| 62-50080 | 3/1987 | Japan . |
| 62-224592 | 10/1987 | Japan . |
| 62-188386 | 11/1987 | Japan . |

Primary Examiner—Allan D. Herrmann
Attorney, Agent, or Firm—Nikaido, Marmelstein, Murray & Oram

[57] ABSTRACT

A compound drive mechanism (30) according to the invention is capable of driving an output element (10, 40) of an industrial robot for a linear motion along an axis and of rotating the output element (10, 40) independently of the linear motion of the output element (10, 40). The mechanism includes a linear-motion drive motor ($M_1$) for driving the output element (10, 40) for linear motion, a rotation drive motor ($M_2$) for driving the output element (10, 40) for a rotational motion arranged at a fixed position, a linear motion transmitting system (12 and 14; 42 and 44) for transmitting a linear motion to the output element (10, 40) a rotational motion transmitting system (18 and 20; 48 and 50) for transmitting a rotational motion to the output element (10, 40), and a rolling contact bearing (18, 46) interconnecting the linear motion transmitting means (12 and 14; 42 and 44) the rotational motion transmitting means (18 and 20; 48 and 50) to thereby obviate interference between those transmission systems.

14 Claims, 5 Drawing Sheets

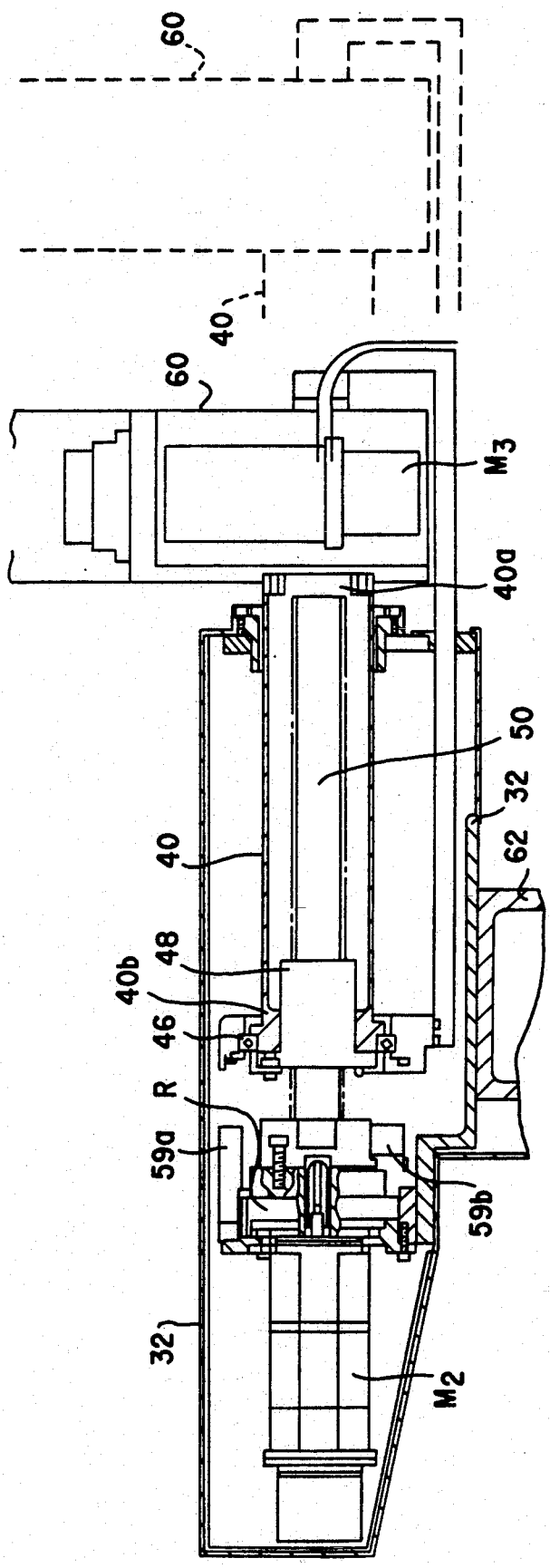

_5,251,500_

INDUSTRIAL ROBOT WITH A COMPOUND DRIVE MECHANISM

DESCRIPTION

TECHNICAL FIELD

The present invention generally relates to a drive mechanism for an industrial robot, and to improvements in a compound drive mechanisms for an industrial robot. More particularly, the present invention relates improvements in a compound drive mechanism for an industrial robot, capable of independently driving an output element for a simultaneous, compound linear motion along the axis thereof and a rotational motion about the axis thereof.

A compound drive mechanism in accordance with the present invention for an industrial robot enables a rotation-drive motor arranged at a fixed position to give a rotational motion to a movable output element capable of being linearly moved by a linear-motion drive motor along an axis thereof via a ball-and-spline means, and reduces a load applied to the linear-motion drive motor to thereby enable the employment of a motor having a load capacity substantially equal to that of the rotation-drive motor as the linear-motion drive motor. The compound drive mechanism can be nonexclusively but effectively incorporated into an industrial robot, particularly an arm assembly thereof provided with a plurality of arm means as movable output elements.

BACKGROUND ART

The arm mechanism provided on the robot unit of a cylindrical coordinates robot or a polar coordinates robot among industrial robots is provided with a robot arm assembly that extends telescopically in opposite directions along an axis. As is generally known, the extremity of such a linear motion robot, in general, is provided directly or through another robot arm with a revolving robot wrist, and a mechanism provided with an end effector, such as a robot hand, is held on the robot wrist.

An industrial robot having a similar linear motion robot arm is used prevalently, for example, as a handling robot for attaching a work to a machine tool, removing the work from the machine tool and transporting the work. Such a handling robot is disclosed in Japanese Examined Pat. Publication (Kokoku) No. Sho 58-41990.

Such an industrial robot with a linear motion robot arm, in general, is provided with a linear motion robot arm interlocked with a linear-motion mechanism, such as a ball-and-screw mechanism comprising a ball-and-screw shaft which is driven for rotation by a drive motor, and a ball-and-screw nut engaging the ball-and-screw shaft for a linear movement along the ball-and-screw shaft. The linear motion robot arm is connected to a rotative-drive unit including a rotative-drive motor and a rotary shaft.

The robot assemblies of the conventional industrial robots including the industrial robot disclosed in Japanese Examined Pat. Publication No. Sho 58-41990 have a compound structure in which a linear motion robot arm functions as a support member on the side of the base of the robot unit, distal movable components remote from the base of the robot unit, including other robot arms and a robot wrist, are arranged rotatably, and rotation drive motors, reduction gears and the like are mounted on the support member. Accordingly, the linear-motion drive motor for the linear motion robot arm is required to have an output capacity capable of linearly moving the heavy components including the rotation drive motor and the reduction gear mounted on the distal components in addition to the linear motion robot arm. Therefore, the linear-motion drive motor for driving the linear motion robot arm nearer to the base must necessarily have a greater output capacity. A motor having a large output capacity is expensive and has a large construction, the size of the linear motion robot arm provided with the motor having a large output capacity is necessarily large, and consequently, the robot unit provided with such a large linear motion robot arm requires an increased space for installation and motion, which is disadvantageous.

DISCLOSURE OF THE INVENTION

Accordingly, an object of the present invention is to provide a compound drive mechanism for an industrial robot, eliminating those disadvantages.

Another object of the present invention is to incorporate improvements into a compound drive mechanism for an industrial robot, capable of independently driving an output element that carries out a compound motion consisting of a linear motion and a rotational motion to enable drive motors having a small size and a small capacity to function properly and to form a robot mechanism including a robot arm assembly in a compact construction.

The present invention employs such an arrangement that a rotation drive motor for rotating an output shaft moved linearly by a linear-motion drive motor is arranged at a fixed position with respect to the output shaft, and a rotary bearing is interposed between a linear motion transmission system for transmitting linear motion to the output shaft and a rotational motion transmission system for transmitting rotational motion to the output shaft to obviate interference between the linear motion transmission system and the rotational motion transmission system.

The present invention provides a compound drive mechanism for an industrial robot, capable of driving one output element thereof for simultaneous linear motion along an axis and independent rotational motion, the compound drive mechanism comprising:

a rotation drive motor means arranged at a fixed position;

a linear-motion drive motor means arranged at a fixed position;

a rotary spline shaft means connected to the rotation drive means;

a spline nut means having one end connected to the output element and in spline engagement with the rotary spline shaft means;

a rotary screw shaft means connected to the linear-motion drive motor means;

a linear motion nut means in a threaded engagement with the rotary screw shaft means for linear motion thereon; and a rolling contact bearing means interposed between the linear motion nut means and the spline nut means to interconnect the linear motion nut means and the spline nut means so that the spline nut means is able to rotate relative to the linear motion nut means;

wherein the linear motion of the linear motion nut means drives the output element for a linear motion through the spline nut means and drives the output element for rotation together with the spline nut means.

Since the spline nut means and the linear motion nut means are interconnected by the rotary bearing means, the spline nut means is moved linearly together with the linear motion nut means to transmit linear motion to the output element. When driven for rotation, the spline nut means rotates independently of the linear motion nut means to transmit a rotative motion to the output element, because the spline nut means and the linear motion nut means are interconnected by the rotary bearing means. Accordingly, the rotation drive motor means, a reduction gear connected to the rotation drive motor means and the associated parts do not act as load on the linear-motion drive motor means, and thus the output capacity and size of the linear-motion drive motor can be reduced accordingly.

BRIEF DESCRIPTION OF THE DRAWINGS

FIG. 3 is a sectional view taken on line III—III in FIG. 2, particularly showing an output element rotating mechanism;

BEST MODE OF CARRYING OUT THE INVENTION

Figure 1:
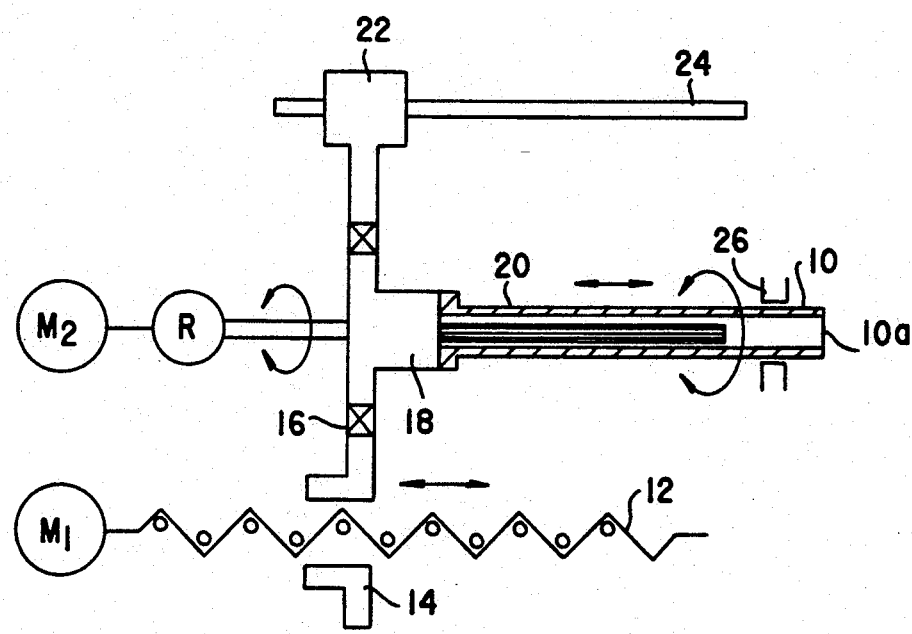
FIG. 1 is a diagrammatic illustration of assistance in explaining a principle on which a compound drive mechanism in accordance with the present invention for an industrial robot is based.

Referring to FIG. 1, a compound drive mechanism in accordance with the present invention for an industrial robot drives an output shaft 10 (i.e., a movable output element capable of compound motion) for linear movement. The compound driving mechanism comprises a ball-and-screw shaft 12 driven for rotation by a linear-motion drive motor $M_1$, a ball-and-screw nut 14 engaging the ball-and-screw shaft 12, and a ball-and-spline nut 18 connected with the ball-and-screw nut 14 by a rolling contact bearing 16. The rear end of the tubular output shaft 10 is joined to the ball-and-spline nut 18 by a suitable means such as bolts. When the ball-and-screw shaft 12 is driven for rotation about its axis by the motor $M_1$, the ball-and-screw nut 14 is driven for linear movement to the right or to the left, as viewed in FIG. 1, along the axis of the ball-and-screw shaft 12. Note, the direction of linear movement of the ball-and-screw nut 14 can be inverted by inverting the direction of rotation of the ball-and-screw shaft 12.

When the ball-and-screw nut 14 is moved linearly, the ball-and-spline nut 18 connected to the ball-and-screw nut 14 by the rolling contact bearing 16 is moved linearly. Since the ball-and-spline nut 18 is in spline engagement with a ball-and-spline shaft 20, the ball-and-spline nut 18 is able to slide linearly along the ball-and-spline shaft 20. Therefore, the ball-and-spline nut 18 moves linearly together with the ball-and-screw nut 14. The linear movement of the ball-and-spline nut 18 is transmitted directly to the output shaft 10 to move the output shaft 10 linearly.

On the other hand, the rear portion of the ball-and-spline shaft 20 is connected to a reduction gear R which in turn is connected to a rotation drive motor $M_2$. When the ball-and-spline shaft 20 is rotated by the rotation drive motor $M_2$, a rotative driving force acts on the ball-and-spline nut 18 in spline engagement with the ball-and-spline shaft 20 to rotate the ball-and-spline nut 18 and the output shaft 10 directly joined to the ball-and-spline nut 18. Since the ball-and-spline nut 18 is supported in the rolling contact bearing 16, the rotation of the ball-and-spline nut 18 is not transmitted to the ball-and-screw nut 14; for example, the output shaft 10 can be independently rotated whether or not the output shaft 10 is in linear motion.

Note, the rotation drive motor $M_2$ for rotating the output shaft 10 is set at a fixed position with respect the output shaft 10; the rotation drive motor $M_2$ is not mounted on the output shaft 10, the ball-and-screw nut 14 or the ball-and-spline nut 18 but is installed at a separate position. Accordingly, the heavy components including the rotation drive motor $M_2$ and the reduction gear R do not act as load on the linear-motion drive motor $M_1$ and thus the load on the linear-motion drive motor $M_1$ can be reduced. A guide element 22 is connected through the rolling contact bearing 16 to the ball-and-spline nut 18, and the guide element 22 is mounted on a straight guide rod 24 for sliding movement thereon as shown in FIG. 1 to guide the output shaft 10 and the ball-and-spline nut 20 for stable linear movement. The front portion of the output shaft 10 is supported in a sealed bush-type journal bearing 26 held in a bearing housing, not shown. The front end 10a of the output shaft 10 is a joining part to be joined to another robot arm member, not shown, or a robot wrist member, not shown. The linear displacement and rotational displacement of the output shaft 10 is transmitted to a member joined to the front end 10a to move the member joined to the front end 10a in a three-dimensional space for composite displacement consisting of linear displacement and rotational displacement. The composite displacement is transmitted through a robot wrist member to an end effector.

Figure 2:
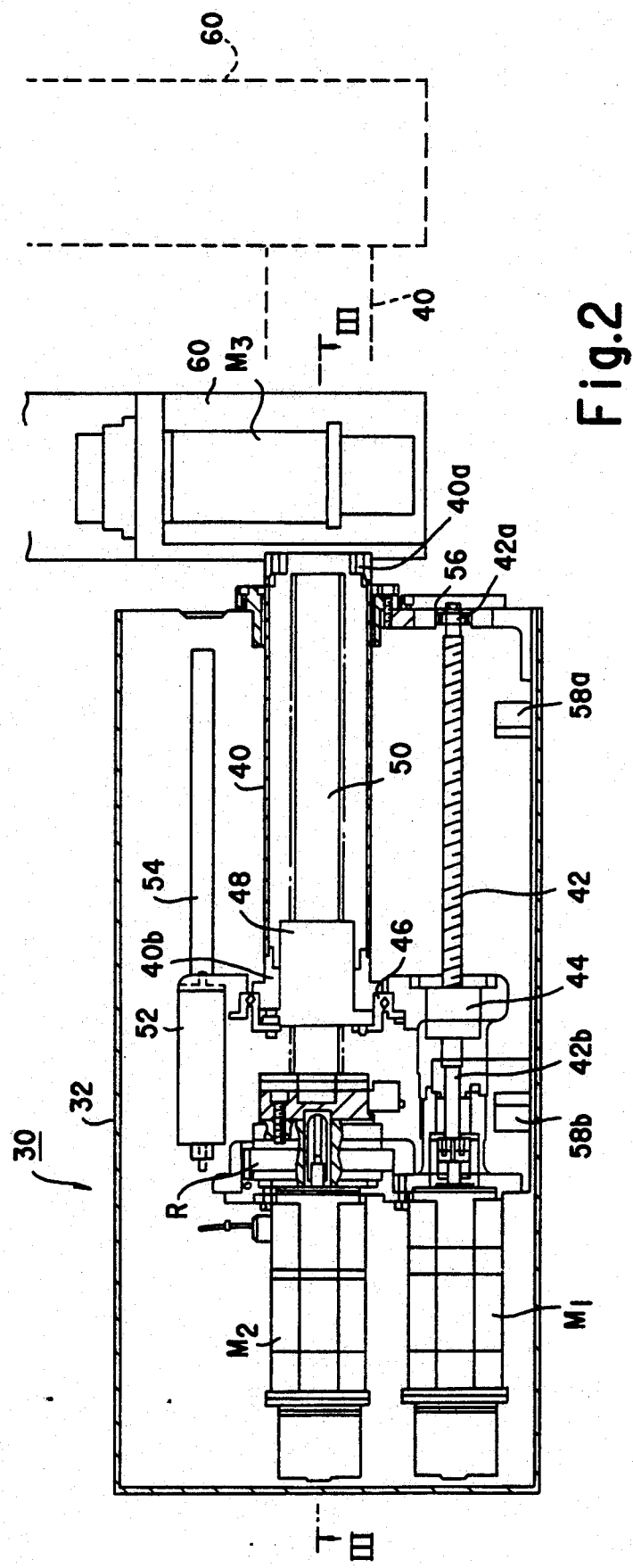
FIG. 2 is a sectional view of a compound drive mechanism in a preferred embodiment according to the present invention as applied to a robot arm assembly of an industrial robot.

FIGS. 2 and 3 show an embodiment of an industrial robot incorporating a compound drive mechanism for driving the output shaft 10 for compound motion consisting of linear motion and rotational motion.

The compound drive mechanism 30 has a housing 32, and a linear-motion drive motor $M_1$ and a rotation drive motor $M_2$, (i.e., electric motors) are disposed fixedly at predetermined positions, respectively, within the housing 32.

An output shaft 40 is supported for both a sliding and rotation movement in a sealed bush-type journal bearing 34 held on one end of the housing 32. The front end 40a of the output shaft 40 projects through the bush-type journal bearing 34 from the housing 32 and another robot arm 60 is joined to the front end 40a.

The output shaft 40, similar to the output shaft shown in FIG. 1, is a tubular shaft. The rear end 40b of the output shaft 40 is fastened by a suitable fastening means such as screws to the front end of a ball-and-spline nut 48 engaging a ball-and-spline shaft 50. The ball-and-spline shaft 50 is connected at its rear end to a coaxial reduction gear R, which in turn is connected to the rotation drive motor $M_2$. The reduction gear R reduces the input speed of the rotation drive motor $M_2$ and enhances the input torque of the rotation drive motor $M_2$ to a lower output speed and a higher output torque to rotate the ball-and-spline shaft 50 by a large output torque about its axis. The rotation of the ball-and-spline shaft is transmitted through the ball-and-spline nut 48 to the output shaft 40.

The ball-and-spline nut 48 and a ball-and-screw nut 44 are interconnected integrally by a cross roller bearing 46, (i.e., a precision rotary bearing). The cross roller bearing 46 intercepts the transmission of the rotation of the ball-and-spline nut 48 to the ball-and-screw nut 44.

The ball-and-screw nut 44 is engaged with a ball-and-screw shaft 42. The ball-and-screw shaft 42 is supported for rotation at its front end 42a in a ball bearing 56 held on the housing 32 and coupled at its rear end 42b with the output shaft of the linear-motion drive motor $M_1$ by a known coupling means. The ball-and-screw shaft 42 is driven for rotation about its axis by the linear-motion drive motor $M_1$, and consequently, the ball-and-screw nut 44 engaging the ball-and-screw shaft 42 is moved linearly along the axis of the ball-and-screw shaft 42. As is obvious from the description of the principle taken with reference to FIG. 1, when the ball-and-screw nut 44 is moved linearly, the ball-and-spline nut 48 is moved linearly together with the output shaft 40. Since the linearly movable structure integrated by the cross roller bearing 46 is separated from the rotation drive motor $M_2$ installed at a fixed position within the housing 32, the weight of the rotation-drive motor $M_2$ and the reduction gear R does not act as load on the linear-motion drive motor $M_1$. Accordingly, the present invention eliminates the disadvantage of the conventional compound driving mechanism that the weight of the drive motor and the reduction gear for driving the distal components acts as a load on the drive motor for driving the base-side components, and thus the drive motor for driving the base-side components must have a large output capacity.

In FIGS. 2 and 3, indicated at 52 is a linear motion guide element connected to the ball-and-spline nut 48 by the cross roller bearing 46 and mounted for sliding motion on a straight guide rod 54 to ensure the stable linear motion of the ball-and-spline nut 48 and the output shaft 40. Indicated at 58a and 58b are stopper means provided within the housing 32 to determine the opposite limits of the linear stroke of the ball-and-screw nut 44, i.e., the stroke of the output shaft 40. The linear motion of the ball-and-screw nut 44 is stopped immediately after the ball-and-screw nut 44 has run up against either of the stopper means 58a or 58b. It is also possible to provide a detecting means, such as a switch, which detects the ball-and-screw nut 44 running up against either of the stopper means 58a or 58b and provides a stop signal to stop the linear-motion drive motor $M_1$.

If it is desired to limit the rotation of the output shaft 40, for example, within an angular range of 120° in each of opposite directions, as shown in FIG. 3, a stopper means 59a is attached to a fixed portion of the rotation drive motor $M_2$, and a striker 59b, which strikes against the stopper means 59a, is attached to a rotary portion which rotates at a fixed position, for example, a portion of the ball-and-spline shaft 50 or a portion of the output member of the reduction gear R. In FIG. 3, the striker 59b is attached to the output member of the reduction gear R.

The output shaft 40 is able to move between two positions, specifically, a fully retracted position indicated by continuous lines where the front end 40a is located at a position in front of the front end of the housing 32 and a fully advanced position indicated by dotted lines to which the front end 40a is advanced together with the robot arm 60 from the housing 32. The output shaft 40 is able to be rotated about its axis independently of the linear motion.

Figure 4A:
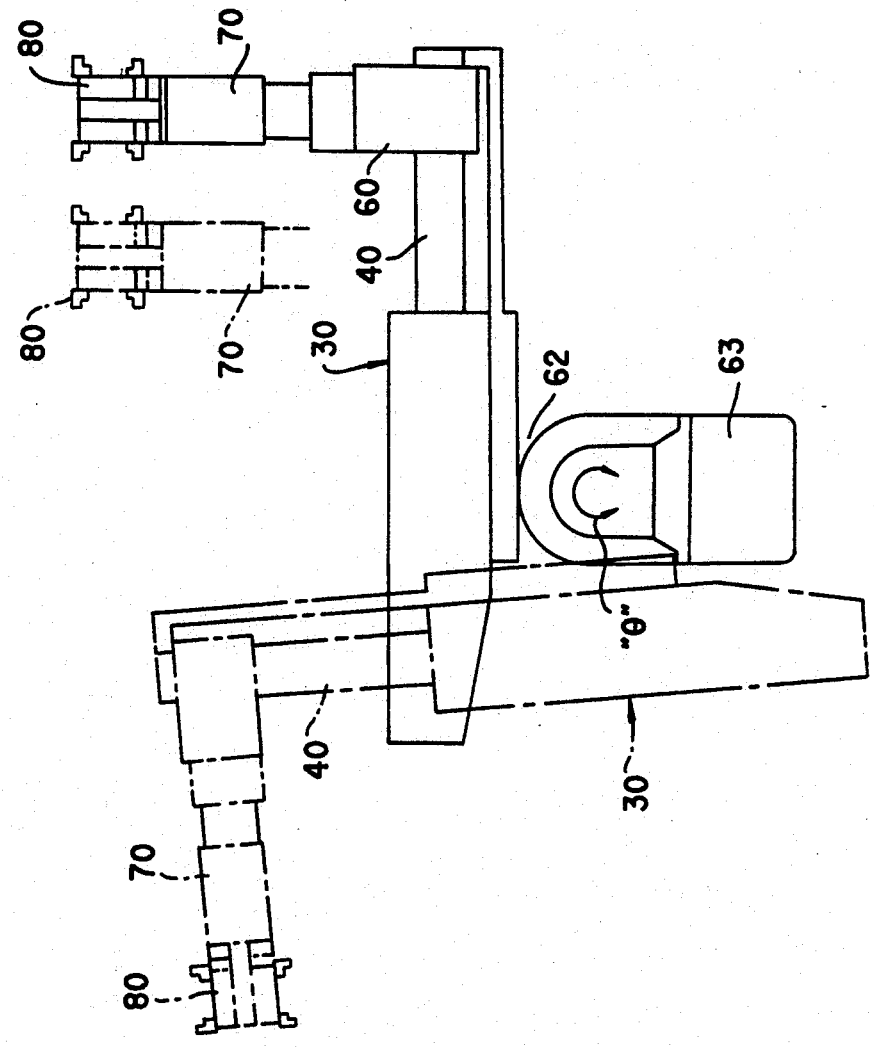
FIG. 4A is a front view of assistance in explaining the general construction and functions of an industrial robot incorporating the compound drive mechanism shown in FIGS. 2 and 3.
Figure 4B:
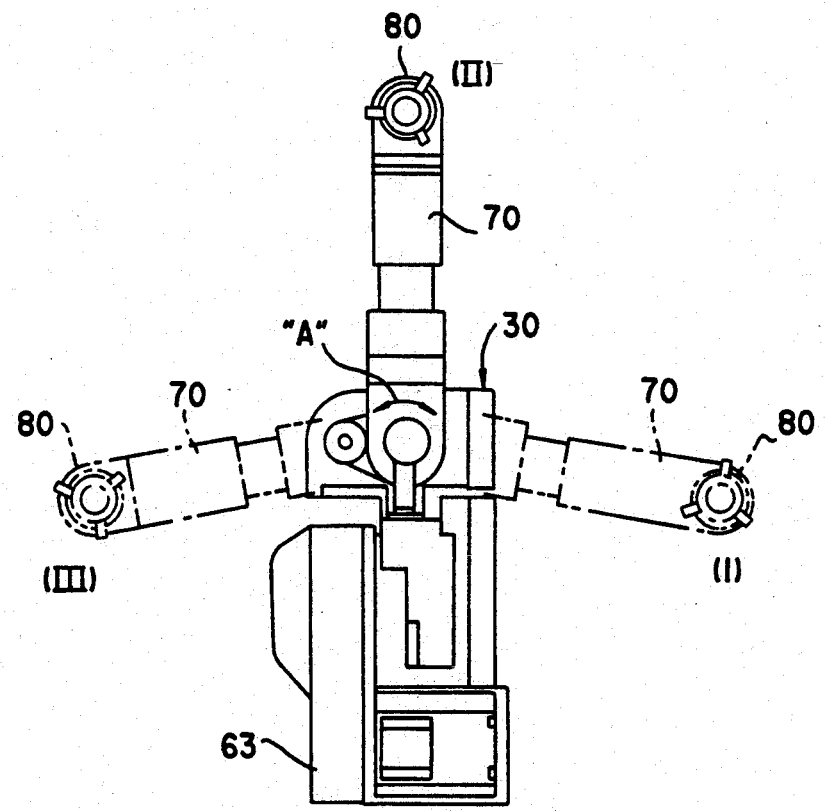
FIG. 4B is a side view showing the general construction of the industrial robot incorporating the compound drive mechanism shown in FIGS. 2 and 3.

A robot wrist, not shown, attached to the extremity of the robot arm 60 is driven by a drive motor $M_3$ mounted on the robot arm 60. The housing 32 supporting the output shaft 40 is supported on a base-side supporting member 62 (FIG. 3) on the side of the base of the robot unit. Naturally, the supporting member 62 may be a movable component of the industrial robot. FIGS. 4A and 4B show the general construction and operation of the industrial robot incorporating the compound driving mechanism shown in FIGS. 2 and 3 as applied to a work handling robot.

As shown in FIGS. 4A and 4B, the robot arm 60 is joined to the front end of the output shaft 40 driven by the compound drive mechanism 30 in accordance with the present invention, a robot wrist 70 is joined to the extremity of the robot arm 60, and the robot wrist 70 is rotated by the drive motor $M_3$ (FIG. 3) mounted on the robot arm 60.

An end effector for handling a workpiece (i.e., a robot hand 80, is mounted on the robot wrist 70. The robot hand 80 is operated by a suitable actuating means, not shown) to grip and release a work.

The supporting member 62 supporting the compound drive mechanism 30 is mounted on a revolving bed 63 so as to be turned about an axis in directions indicated by the arrows $\theta$. Accordingly, the compound drive mechanism 30 is able to turn between a position indicated by continuous lines and a position indicated by alternate long and short dash line shown in FIG. 4A together with the distal components, i.e., the robot arm 60, the robot wrist 70 and the robot hand 80. The robot wrist 70 and the robot hand 80 can be shifted from a position (I) via an upright position (II) to a position (III) and vice versa as shown in FIG. 4B by rotating the output shaft 40 about its axis by the rotation drive motor $M_2$ in opposite directions. Accordingly, the robot hand 80 is able to carry out a work handling operation for, for example, gripping a work at the position (I), feeding the work to, for example, a machine tool at the position (II), returning a finished work to a work rack at the position (III) and receiving a new work.

As apparent from the foregoing description, the compound drive mechanism in accordance with the present invention for an industrial robot has a rotation drive motor means for rotating an output shaft driven for linear motion by a linear-motion drive motor means, installed at a fixed position with respect to the output shaft, and a linear motion transmitting system for transmitting linear motion to the output shaft and a rotational motion transmitting system for transmitting rotational motion to the output shaft are interconnected by a rolling contact bearing to obviate interference between the linear motion transmitting system and the rotational motion transmitting system. Accordingly, the weight of the rotation drive motor means and the reduction gear does not act as load on the linear-motion drive motor means. Therefore, the linear-motion drive motor means needs only an output capacity sufficient for linearly moving the output shaft, and the rotation drive motor means needs only an output capacity sufficient for rotating the output shaft. Since the causes of an increased load on the drive motors are eliminated, the drive motors may have substantially the same output capacity, and thus the disadvantage that one of the drive motors must have an output capacity and size greater than those of the other is eliminated. Consequently, the cost of the drive motors can be reduced and the compound drive mechanism can be formed in a compact construction.

We claim:

1. A compound drive mechanism for an industrial robot, capable of driving an output element thereof for linear motion and of driving said output element for a rotational motion independently of the linear motion, said compound drive mechanism comprising:
   a housing means for internally accommodating said compound drive mechanism;
   a rotation drive motor means arranged at a fixed position in said housing means;
   a linear-motion drive motor means arranged at a fixed position in said housing means;
   a rotary spline shaft means attached at a first end to said rotation drive motor means;
   a spline nut means having one end joined to said output element and engaging said rotary spline shaft means;
   a rotary screw shaft means attached at an inner end to said linear-motion drive motor means;
   a liner-motion nut means engaged with said rotary screw shaft means for a linear motion on said rotary screw shaft means; and
   a rolling contact bearing means interconnecting said linear-motion nut means and said spline nut means to thereby relatively rotate said spline nut means with respect to said linear-motion nut means, wherein
   the linear motion of said linear-motion nut means moves the output element linearly through the spline nut means, and the output element is rotated together with the spline nut means.

2. A compound drive mechanism for an industrial robot according to claim 1, further comprising:
   a housing means internally accommodating said rotary screw shaft means connected to said linear-motion drive motor means and said rotary spline shaft means connected to said rotation drive motor means in a parallel arrangement, and having one end provided with an opening; and
   a bush-type journal bearing means held on the end of the housing provided with said opening, wherein said output element is extended through said opening for linear and rotational motions.

3. A compound drive mechanism for an industrial robot according to claim 1, further comprising:
   a guide rod means extended in parallel with said rotary screw shaft means and said rotary spline shaft means; and
   a guide element mounted on said guide rod means and connected through said rolling contact bearing means to the spline nut means to guide said output element for a linear motion.

4. A compound drive mechanism for an industrial robot according to claim 1, wherein said output element is a robot arm means of the industrial robot.

5. A compound drive mechanism for an industrial robot according to claim 2, further comprising:
   first stopper means disposed at predetermined positions on a line parallel to the axis of said output element to limit the range of a linear motion of said linear-motion nut means; and
   second stopper means disposed around the axis of the output element to limit an angular range of a rotation of said rotary spline shaft means.

6. An industrial robot having a compound drive mechanism capable of driving an output element with linear motion and a rotational motion independently of the linear motion such that the rotational motion effects the linear motion, said compound drive mechanism comprising:
   a housing means for internally accommodating said compound drive mechanism;
   a rotation drive means fixedly positioned in said housing means, for rotatively driving the output element, said rotation drive means including a rotation drive motor with a rotary spline shaft attached thereto;
   a linear-motion drive means fixedly positioned in said housing means, for linearly driving the output element, said linear-motion drive means including a linear-motion drive motor with a rotary screw shaft attached thereto;
   a spline nut means connected to the output element and engaging with said rotation drive means through the rotary spline shaft, for effecting rotational motion of the output element;
   a linear-motion nut means connected to the output element and engaged with said linear-motion drive means through the rotary screw shaft, for effecting linear motion of the output element; and
   a rolling contact bearing means interconnecting said linear-motion nut means and said spline nut means, for relatively rotating said spline nut means with respect to said linear-motion nut means, wherein
   said linear-motion drive means is formed such that rotation of the rotary screw shaft effects the linear motion of said linear-motion nut means thereby moving the output element linearly through said spline nut means, and
   said rotation drive means is operatively positioned parallel to said linear-motion drive means such that said rotation of the rotary spline shaft with said spline nut means effects rotation of the output element relative to and in conjunction with the linear motion from said linear-motion drive means.

7. An industrial robot according to claim 6, further comprising:
   a bush-type journal bearing means formed with said housing means for providing bearing support for the output element during linear motion and rotation.

8. An industrial robot according to claim 6, further comprising:
   a guide rod means extending parallel to the rotary screw shaft and the rotary spline shaft, for guiding the linear motion of the output element; and
   a guide element operatively engaged with said guide rod means and connected through said rolling contact bearing means to said spline nut means so as to guide the output element during linear motion.

9. A compound drive mechanism for an industrial robot according to claim 7, further comprising:
   first stopper means disposed at predetermined positions on a line parallel to an axis of the output element, for limiting a range of the linear motion of said linear-motion nut means; and second stopper means disposed around the axis of the output element to limit an angular range of rotation of the rotary spline shaft.

10. A compound drive mechanism in an industrial robot for effecting linear motion and a rotational motion independently of the linear motion such that the rotational motion effects the linear motion, said compound drive mechanism comprising:
   an output element;
   a housing means for internally accommodating said compound drive mechanism;
   a rotation drive means fixedly positioned in said housing means, for rotatively driving said output element, said rotation drive means including a rotation drive motor with a rotary spline shaft attached thereto;
   a linear-motion drive means fixedly positioned in said housing means, for linearly driving said output element, said linear-motion drive means including a linear-motion drive motor with a rotary screw shaft attached thereto;
   a spline nut means connected to said output element and engaging with said rotation drive means through the rotary spline shaft, for effecting rotational motion of said output element;
   a linear-motion nut means connected to the output element and engaged with said linear-motion drive means through the rotary screw shaft, for effecting linear motion of said output element; and
   a rolling contact bearing means interconnecting said linear-motion nut means and said spline nut means, for relatively rotating said spline nut means with respect to said linear-motion nut means, herein
   said linear-motion drive means is formed such that rotation of the rotary screw shaft effects the linear motion of said linear-motion nut means thereby moving said output element linearly through said spline nut means, and
   said rotation drive means is operatively positioned parallel to said linear-motion drive means such that said rotation of the rotary spline shaft with said spline nut means effects rotation of said output element relative to and in conjunction with the linear motion from said linear-motion drive means.

11. An industrial robot according to claim 10, further comprising:
   a bush-type journal bearing means formed with said housing means for providing bearing support for said output element during linear motion and rotation.

12. An industrial robot according to claim 10, further comprising:
   a guide rod means extending parallel to the rotary screw shaft and the rotary spline shaft, for guiding the linear motion of said output element; and
   a guide element operatively engaged with said guide rod means and connected through said rolling contact bearing means to said spline nut means so as to guide said output element during linear motion.

13. A compound drive mechanism for an industrial robot according to claim 11, further comprising:
   first stopper means disposed at predetermined positions on a line parallel to an axis of said output element, for limiting a range of the linear motion of said linear-motion nut means; and
   second stopper means disposed around the axis of said output element to limit an angular range of rotation of the rotary spline shaft.

14. A compound drive mechanism for an industrial robot according to claim 10, wherein said output element is a robot arm means of the industrial robot.

* * * * *